United States Patent
Reshef et al.

(10) Patent No.: US 11,577,733 B2
(45) Date of Patent: Feb. 14, 2023

(54) EFFICIENT ROAD COORDINATES TRANSFORMATIONS LIBRARY

(71) Applicant: GM Global Technology Operations LLC, Detroit, MI (US)

(72) Inventors: Roi Reshef, Herzliya (IL); Vlad Goldner, Tel Aviv (IL); Yevgeni Shaphirov, Yoqneam Illit (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 86 days.

(21) Appl. No.: 17/038,141

(22) Filed: Sep. 30, 2020

(65) Prior Publication Data

US 2022/0097714 A1 Mar. 31, 2022

(51) Int. Cl.
*B60W 40/072* (2012.01)
*B60W 60/00* (2020.01)
(Continued)

(52) U.S. Cl.
CPC ........ *B60W 40/072* (2013.01); *B60W 60/001* (2020.02); *G06K 9/6215* (2013.01);
(Continued)

(58) Field of Classification Search
CPC ............. B60W 40/072; B60W 60/001; B60W 2554/802; B60W 2554/801; G06V 20/588; G06K 9/6215
(Continued)

(56) References Cited

U.S. PATENT DOCUMENTS

2008/0262721 A1* 10/2008 Guo ................. G01C 21/32
  701/532
2016/0313130 A1  10/2016 Baselau et al.
(Continued)

FOREIGN PATENT DOCUMENTS

DE   102013009856 A1   12/2014
DE   102017206987 A1   10/2018
(Continued)

OTHER PUBLICATIONS

Lecture 7: Differential Geometry of Curves II, 2016, University of Alberta (Year: 2016).*
(Continued)

*Primary Examiner* — Elaine Gort
*Assistant Examiner* — Matthias S Weisfeld
(74) *Attorney, Agent, or Firm* — Cantor Colburn LLP

(57) ABSTRACT

A system and method operate an autonomous vehicle. A sensor senses a road and an object. A processor determines, in a Cartesian reference frame, a representation of the road and a source point representative of the object, samples a first waypoint and a second waypoint from the representation of the road, determines a linear projection of the source point to a line connecting the first waypoint and the second waypoint, determines a first estimate of a longitudinal component of the source point in a road-based reference frame based on the linear projection, the first estimate being on a curve representing the road between the first waypoint and the second waypoint, determines a second estimate of the longitudinal component from the first estimate, determines a coordinate of the source point in the road-based reference frame from the second estimate and operates the vehicle with respect to the object using the coordinate.

19 Claims, 5 Drawing Sheets

(51) Int. Cl.
  *G06K 9/62* (2022.01)
  *G06V 20/56* (2022.01)
(52) U.S. Cl.
  CPC ..... *G06V 20/588* (2022.01); *B60W 2554/801* (2020.02); *B60W 2554/802* (2020.02)
(58) Field of Classification Search
  USPC .......................................................... 701/23
  See application file for complete search history.

(56) References Cited

U.S. PATENT DOCUMENTS

| | | | |
|---|---|---|---|
| 2017/0268873 A1* | 9/2017 | Jouanet | G01B 21/20 |
| 2018/0237007 A1* | 8/2018 | Adam | B60W 50/14 |
| 2018/0373254 A1* | 12/2018 | Song | G05D 1/0212 |
| 2020/0001921 A1* | 1/2020 | Balesteros-Tolosana | B60W 40/072 |
| 2020/0385014 A1* | 12/2020 | Hanniel | B60W 60/001 |
| 2021/0264788 A1* | 8/2021 | Vladimerou | B60Q 9/008 |

FOREIGN PATENT DOCUMENTS

| | | | |
|---|---|---|---|
| DE | 102018114888 A1 | 12/2018 | |
| DE | 102019102679 A1 * | 8/2020 | ......... G06K 9/00791 |
| DE | 102019102679 A1 | 8/2020 | |

OTHER PUBLICATIONS

Werling et al.; Optimal Trajectory Generation for Dynamic Street Scenarios in a Frenet Frame; 2010 IEEE International Conference on Robotics and Automation; pp. 987-993.
German Office Action Issued In DE Application No. 10 2021 111 230.3, Office Action dated Dec. 23, 2021, 8 Pages.

* cited by examiner

EFFICIENT ROAD COORDINATES TRANSFORMATIONS LIBRARY

INTRODUCTION

The subject disclosure relates to autonomous vehicles and, in particular, to a system and method for efficient projection of objects onto a road-based reference frame.

A partially or fully autonomous vehicle tracks objects in its environment and performs navigational maneuvers with respect to these objects. The objects are sensed using a sensor at the vehicle and mapped to a Cartesian coordinate system. However, for computational efficiency, it is desirable to perform calculations in a road-centered coordinate system (also known as a Frenet space) that moves along a road, off-road path, curve or path-like construction. Transforming from the Cartesian coordinate system to the Frenet space can become computationally expensive if applied at scale. Accordingly, it is desirable to provide a computationally efficient system and method for transforming an object's coordinates from a Cartesian coordinate system to a road-centered coordinate system.

SUMMARY

In one exemplary embodiment, a method of operating an autonomous vehicle is disclosed. A representation of a road and a source point representative of an object is determined in a Cartesian reference frame. A first waypoint and a second waypoint are sampled from the representation of the road. A linear projection of the source point to a linear segment connecting the first waypoint and the second waypoint is determined. A first estimate of a longitudinal component of the source point is determined in a road-based reference frame based on the linear projection, the first estimate being located on a curve representing the road and connecting the first waypoint and the second waypoint. A second estimate of the longitudinal component of the source point is determined in the road-based reference frame from the first estimate. A coordinate of the source point in the road-based reference frame is determined from the second estimate of the longitudinal component. The vehicle is operated with respect to the object using the coordinate of the source point in the road-based reference frame.

In addition to one or more of the features described herein, the second estimate of the longitudinal component is determined using a circular arc approximation to the curve. The second estimate is realized in the Cartesian reference frame by interpolating a closest waypoint to the second estimate using a Taylor series approximation and Frenet-Serret formulas. At least the first waypoint and the second waypoint are grouped into a plurality of waypoint clusters and a waypoint cluster is selected from the plurality of waypoint clusters based on a distance from the waypoint cluster to the source point. A source cluster is formed that includes the source point and the waypoint cluster is selected based on the distance between the source cluster and the waypoint cluster. The method further includes determining a lateral component of the source point using the second estimate of the longitudinal component. In an embodiment, the representation of the road is a spline of polynomials.

In another exemplary embodiment, a system for operating an autonomous vehicle is disclosed. The system includes a sensor and a processor. The sensor senses a road and an object. The processor is configured to determine, in a Cartesian reference frame, a representation of the road and a source point representative of the object, sample a first waypoint and a second waypoint from the representation of the road, determine a linear projection of the source point to a line connecting the first waypoint and the second waypoint, determine a first estimate of a longitudinal component of the source point in a road-based reference frame based on the linear projection, the first estimate located on a curve representing the road and connecting the first waypoint and the second waypoint, determine a second estimate of the longitudinal component of the source point in the road-based reference frame from the first estimate, determine a coordinate of the source point in the road-based reference frame from the second estimate of the longitudinal component, and operate the vehicle with respect to the object using the coordinate of the source point in the road-based reference frame.

In addition to one or more of the features described herein, the processor is further configured to determine the second estimate using a circular arc approximation to the curve. The processor is further configured to realize the second estimate in the Cartesian reference frame by interpolating a closest waypoint to the second estimate using a Taylor series approximation and Frenet-Serret formulas. The processor is further configured to group at least the first waypoint and the second waypoint into a plurality of waypoint clusters and select a waypoint cluster from the plurality of waypoint clusters based on a distance from the waypoint cluster to the source point. The processor is further configured to form a source cluster that includes the source point and select the waypoint cluster based on the distance between the source cluster and the waypoint cluster. The processor is further configured to determine a lateral component of the source point using the second estimate of the longitudinal component. In an embodiment, the representation of the road is a spline of polynomials.

In yet another exemplary embodiment, an autonomous vehicle is disclosed. The autonomous vehicle includes a sensor and a processor. The sensor senses a road and an object. The processor is configured to determine, in a Cartesian reference frame, a representation of the road and a source point representative of the object, sample a first waypoint and a second waypoint from the representation of the road, determine a linear projection of the source point to a line connecting the first waypoint and the second waypoint, determine a first estimate of a longitudinal component of the source point in a road-based reference frame based on the linear projection, the first estimate located on a curve representing the road and connecting the first waypoint and the second waypoint, determine a second estimate of the longitudinal component of the source point in the road-based reference frame from the first estimate, determine a coordinate of the source point in the road-based reference frame from the second estimate of the longitudinal component, and operate the vehicle with respect to the object using the coordinate of the source point in the road-based reference frame.

In addition to one or more of the features described herein, the processor is further configured to determine the second estimate using a circular arc approximation to the curve and realize the second estimate in the Cartesian frame by interpolating the closest waypoint to the second estimate using a Taylor series approximation and Frenet-Serret formulas. The processor is further configured to group at least the first waypoint and the second waypoint into a plurality of waypoint clusters, from a source cluster that includes the source point, and select a waypoint cluster from the plurality of waypoint clusters based on a distance between the source cluster and the waypoint cluster. The processor is further configured to determine a lateral component of the source point using the second estimate of the longitudinal component. In an embodiment, the representation of the road is a spline of polynomials. In an embodiment, the representation of the road is a lane center of the road.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
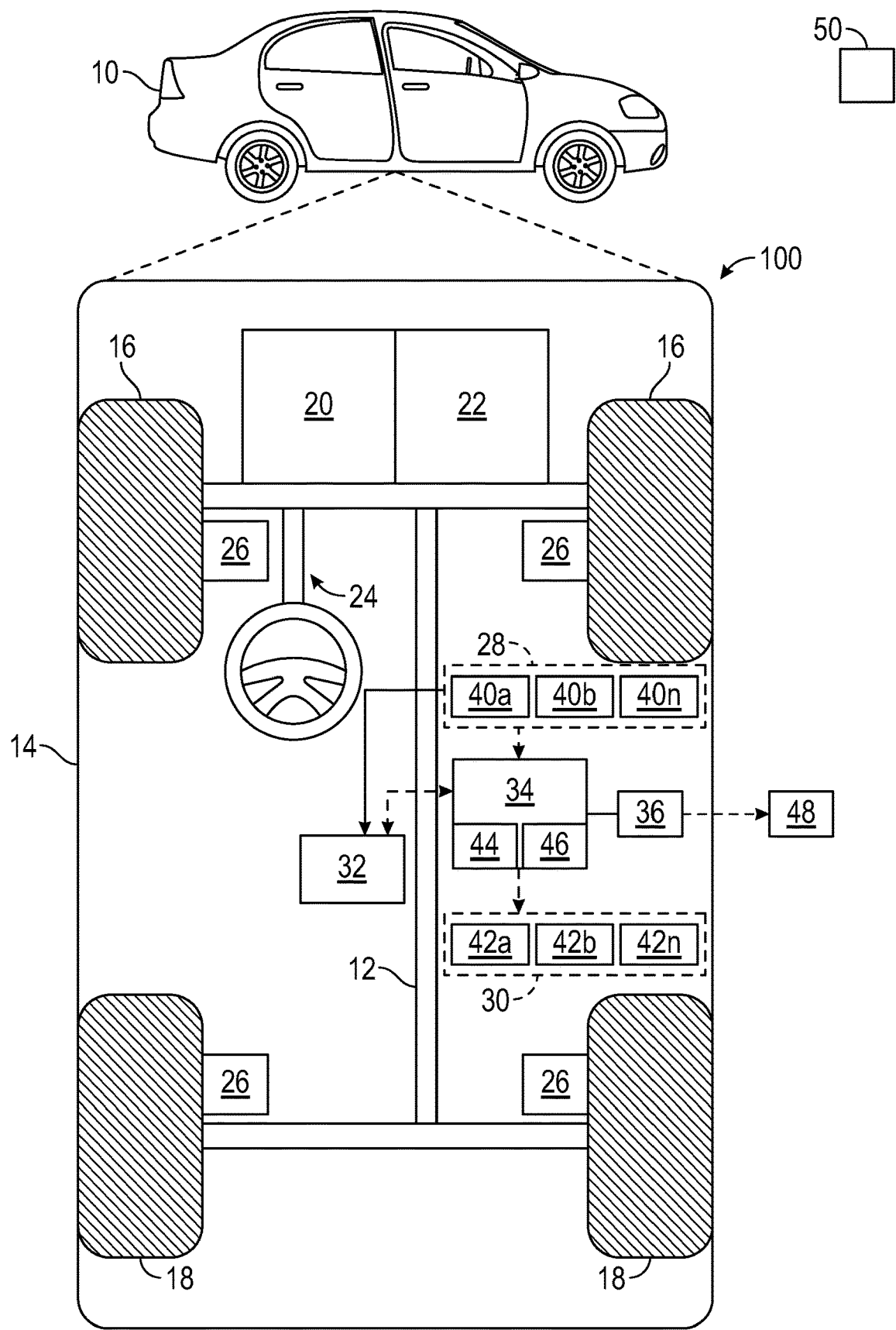
FIG. 1 shows a vehicle in accordance with an exemplary embodiment.

The following description is merely exemplary in nature and is not intended to limit the present disclosure, its application or uses. It should be understood that throughout the drawings, corresponding reference numerals indicate like or corresponding parts and features.

In accordance with an exemplary embodiment, FIG. 1 shows a vehicle 10. In an exemplary embodiment, the vehicle 10 is a semi-autonomous or autonomous vehicle. In various embodiments, the vehicle 10 includes at least one driver assistance system for both steering and acceleration/deceleration using information about the driving environment, such as cruise control and lane-centering. While the driver can be disengaged from physically operating the vehicle 10 by having his or her hands off the steering wheel and foot off the pedal at the same time, the driver must be ready to take control of the vehicle.

In general, a trajectory planning system 100 determines a trajectory plan for automated driving of the vehicle 10. The vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The front wheels 16 and rear wheels 18 are each rotationally coupled to the chassis 12 near respective corners of the body 14.

As shown, the vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the front wheels 16 and rear wheels 18 according to selectable speed ratios. According to various embodiments, the transmission system 22 may include a step-ratio automatic transmission, a continuously variable transmission, or other appropriate transmission. The brake system 26 is configured to provide braking torque to the front wheels 16 and rear wheels 18. The brake system 26 may, in various embodiments, include friction brakes, brake by wire, a regenerative braking system such as an electric machine, and/or other appropriate braking systems. The steering system 24 influences a position of the front wheels 16 and rear wheels 18. While depicted as including a steering wheel for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the vehicle 10, including an object 50. The object 50 can be other road users, road elements such as a lane center or lane edge, or other objects. The sensing devices 40a-40n can include, but are not limited to, radars, lidars, global positioning systems, optical cameras, thermal cameras, ultrasonic sensors, and/or other sensors for observing and measuring parameters of the exterior environment. The sensing devices 40a-40n may further include brake sensors, steering angle sensors, wheel speed sensors, etc. for observing and measuring in-vehicle parameters of the vehicle. The cameras can include two or more digital cameras spaced at a selected distance from each other, in which the two or more digital cameras are used to obtain stereoscopic images of the surrounding environment in order to obtain a three-dimensional image. The actuator system 30 includes one or more actuator devices 42a-42n that control one or more vehicle features such as, but not limited to, the propulsion system 20, the transmission system 22, the steering system 24, and the brake system 26. In various embodiments, the vehicle 10 can further include interior and/or exterior features such as, but are not limited to, doors, a trunk, and cabin features such as air, music, lighting, etc. (not numbered).

The at least one controller 34 includes a processor 44 and a computer readable storage device or media 46. The processor 44 can be any custom made or commercially available processor, a central processing unit (CPU), a graphics processing unit (GPU), an auxiliary processor among several processors associated with the at least one controller 34, a semiconductor-based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the at least one controller 34 in controlling the vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the vehicle 10, and generate control signals to the actuator system 30 to automatically control the components of the vehicle 10 based on the logic, calculations, methods, and/or algorithms. Although only one controller is shown in FIG. 1, embodiments of the vehicle 10 can include any number of controllers that communicate over any suitable communication medium or a combination of communication mediums and that cooperate to process the sensor signals, perform logic, calculations, methods, and/or algorithms, and generate control signals to automatically control features of the vehicle 10.

The communication system 36 is configured to wirelessly communicate information to and from other entities 48, such as but not limited to, other vehicles ("V2V" communication) infrastructure ("V2I" communication), remote systems, and/or personal devices. In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

While the vehicle is disclosed herein as a fully autonomous or partially autonomous vehicle, this is not meant to be limitation of the invention. In other embodiments, the vehicle can be any type of partially autonomous or fully autonomous vehicle, such as a motorcycle, scooter, or mobile robot, for example.

Figure 2:
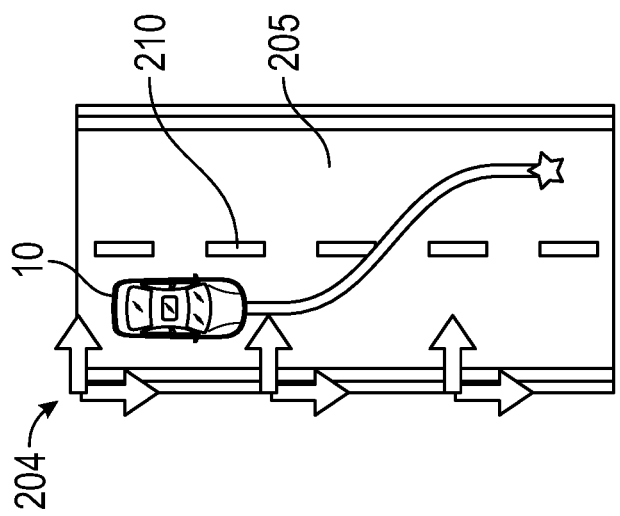
FIG. 2 illustrates a transformation process between a Cartesian reference frame and a road-centered reference frame.
Figure 2:
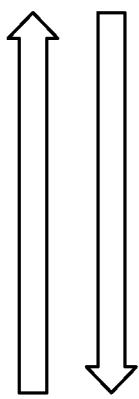
Figure 2:
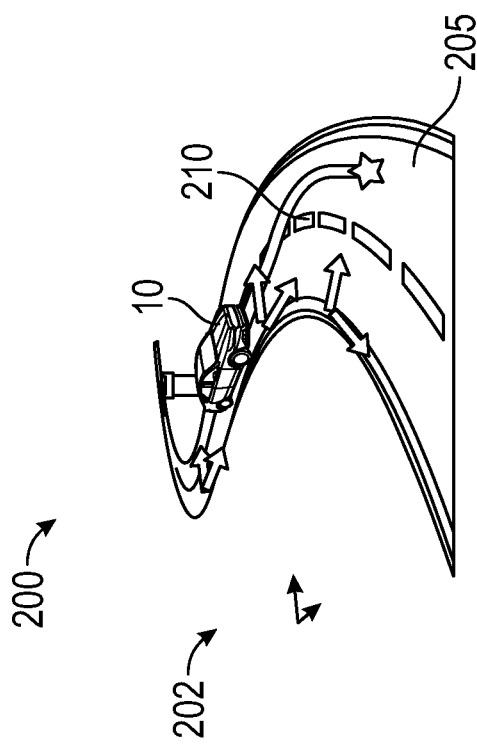

FIG. 2 illustrates a transformation process 200 between a Cartesian reference frame 202 and a road-centered reference frame 204. The Cartesian reference frame 202 is stationary with respect to a road 205, while the road-centered reference frame 204 moves along the road. In an embodiment, the road-centered reference frame 204 moves along a lane center 210 of the road 205. In the road-centered reference frame 204, the road 205 can appear as a straight line. The road 205 can include a curved section as shown in the Cartesian reference frame 202. The vehicle 10 senses various source points associated with objects in the Cartesian reference frame 202. The various source points can include the positions or coordinates of the vehicle 10 itself, other road users, the lane center 210 of the road 205, other objects, etc. Each source point may be parametrized within the Cartesian reference frame 202 using 6 degrees of freedom, including the x, y, yaw, velocity, acceleration and curvature ($\kappa$) for the source point. The same source point may be parametrized within the road-centered reference frame 204 by a longitudinal position (s) of the source point, a lateral position (d) of the source point as well as their relative time-derivatives (e.g. velocities and accelerations) along those two axes. Thus, the source point may be parameterized in the road-centered reference frame by $(s, \dot{s}, \ddot{s}, d, \dot{d}, \ddot{d})$. To navigate the vehicle 10, the Cartesian coordinates of the source points are transformed into the road-centered reference frame 204. Computations for determining a trajectory for the vehicle 10 are then performed in the road-centered reference frame 204. The trajectory is transformed back from the road-centered reference frame 204 into the Cartesian reference frame 202 in order to be tracked by vehicle 10.

Figure 3:
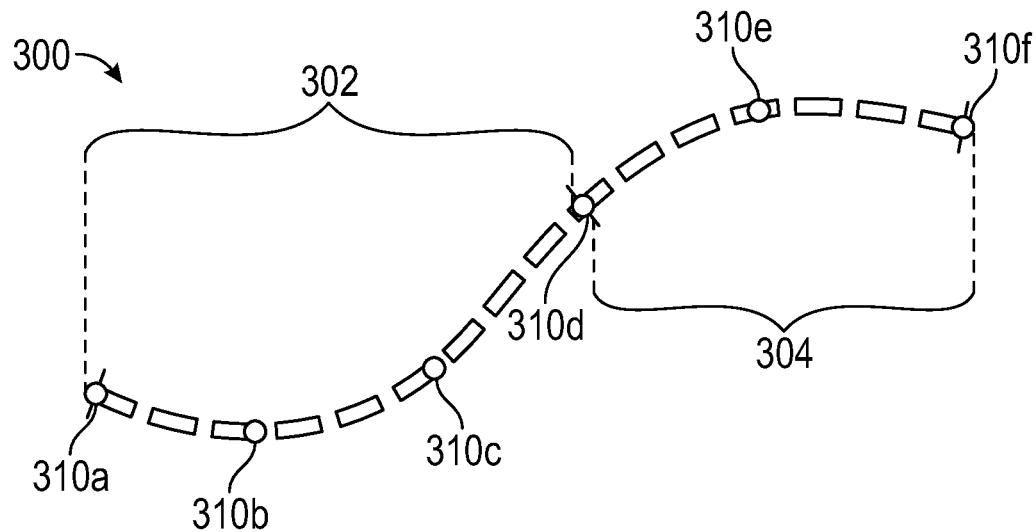
FIG. 3 shows a mathematical representation of a road.

FIG. 3 shows a mathematical representation of the road 205 (i.e., of a lane center 210 of the road 205). In various embodiments, the sensing devices 40a-40n sense the lane center 210 and the processor 44 represents the lane center 210 as a polynomial function. In other embodiments, the representation of the road 205 can be a precomputed quantity that is stored in a map database. The precomputed representation can be, for example, transmitted to the vehicle from a satellite, street camera or other external device. In particular, the lane center 210 is represented as a spline of polynomial functions. For the illustrative spline shown in FIG. 3, a first polynomial function represents a section 302 between rear waypoint 310a and middle waypoint 310d. A second polynomial function represents a section 304 between middle waypoint 310d and front waypoint 310f. The first polynomial function and second polynomial function are continuous and continuously differentiable at the middle waypoint 310d.

The processor 44 samples each polynomial function in order to generate a set of waypoints. Sampling the first polynomial function generates waypoints 310b and 310c. Sampling the second polynomial function generates waypoint 301e. The processor 44 samples the polynomial functions uniformly so that the distance between waypoints along a polynomial function is the same. Each waypoint 310a-310f has an associated set of waypoint statistics, which includes a position (x,y) of the waypoint, the two-dimensional tangent and Normal Vectors ($\vec{T}$, $\vec{N}$) of the waypoint, the local curvature and first derivative of the local curvature ($\kappa$, $\kappa'$) at the waypoint. The waypoints give an approximation of the road-centered reference frame.

Sampling of the waypoints from the polynomial can be performed either online (at the vehicle) or offline (away from the vehicle). In online sampling, the polynomial functions representing the road are stored in a storage database. The online processor queries the database for a selected polynomial function and samples the polynomial to obtain the waypoints and their waypoint statistics. In offline sampling, the sampling of waypoints from the polynomial is performed offline. The online processor then queries the database for the waypoints directly. Online sampling is generally more storage-effect but requires more online computations. Offline sampling is generally more storage-inefficient but requires less online computation.

Figure 4:
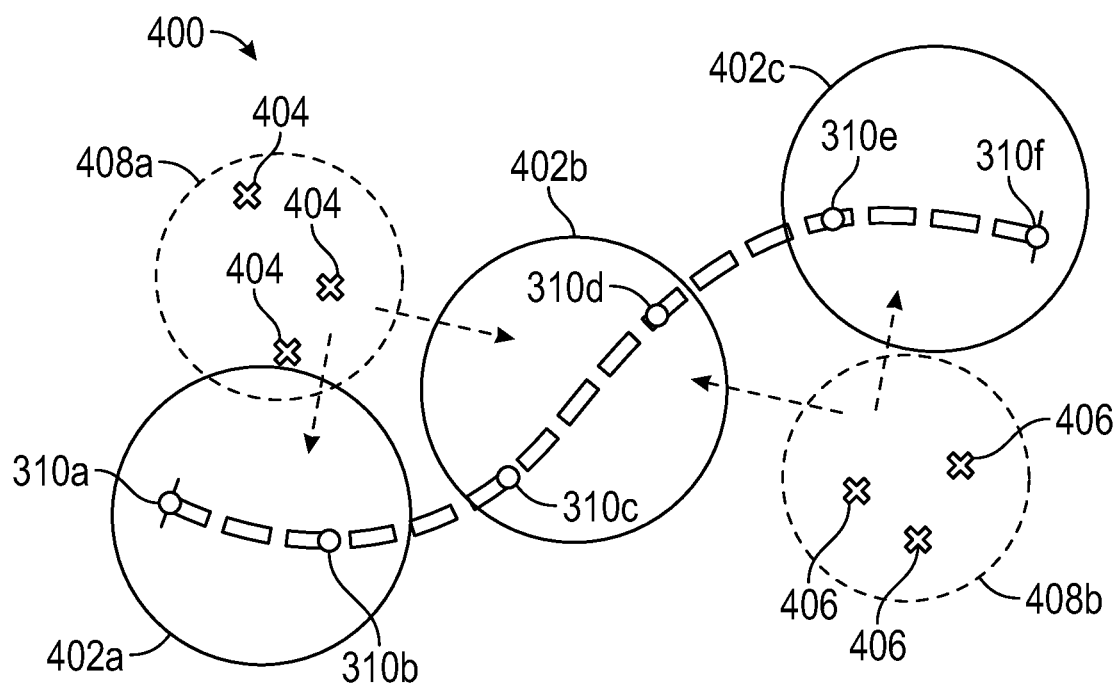
FIG. 4 shows a clustering method for associating a source point with nearest neighboring waypoints.

FIG. 4 shows a clustering method for associating a source point with nearest neighboring waypoints on the illustrative spline of FIG. 3. The source points can include the vehicle 10, other road users, static objects, destination points, or any other object relevant to trajectory planning for the vehicle. The clustering method groups source points into one or more source clusters and groups waypoints into one or more waypoint clusters. Distances between a selected source cluster and the one or more waypoint clusters can be determined. For the selected source cluster, the processor 44 selects one more waypoint clusters having a shortest or minimum distance to the selected source cluster as being relevant to the selected source cluster. By determining the location of the relevant waypoints in the manner illustrated in FIG. 4, the need to match the source points to all waypoints in order to find the nearest neighbor waypoints is eliminated.

As shown in FIG. 4 for the illustrative spline, waypoints 310a and 310b have been grouped into a first waypoint cluster 402a, waypoints 310c and 310d have been grouped into a second waypoint cluster 402b, and waypoints 310e and 310f have been grouped into a third waypoint cluster 402c. Source points 404 have been grouped into a first source cluster 408a, and sources 406 have been grouped into a second source cluster 408b. Distances are determined between the first source cluster 408a and waypoint clusters 402a, 402b and 402c. The smallest inter-cluster distances are between the first source cluster 408a and the first waypoint cluster 402a and between the first source cluster 408a and the second waypoint cluster 402b. Therefore, the first waypoint cluster 402a and second waypoint cluster 402b are selected as relevant to source points 404 of the first source cluster 408a. Similarly, comparison of distances associates the second source cluster 408b with the second waypoint cluster 402b and third waypoint cluster 402c. As an example, a KD-Tree can be used to group the waypoints into clusters, such that querying for a nearest neighboring waypoint to a selected source point in space (e.g. source point or cluster centroid) is done efficiently and saves computation.

Figure 5:
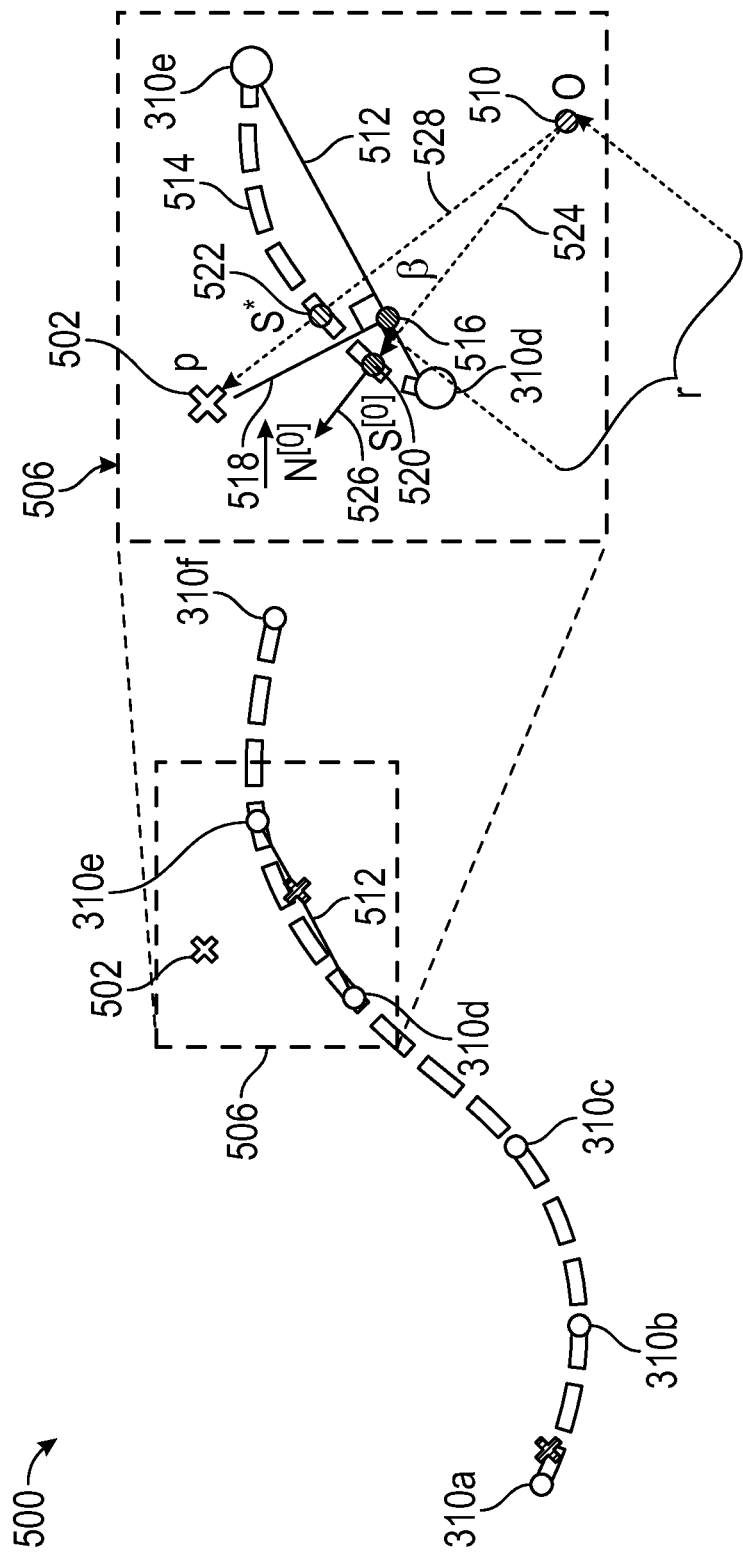
FIG. 5 illustrates a method of obtaining an estimate of a longitudinal component of a source point in a road-centered reference frame.

FIG. 5 illustrates a method of obtaining an estimate of a longitudinal component of a source point in a road-centered reference frame. A source point 502 is shown associated with waypoints 310d and 310e. A region 506 including waypoints 310d, 310e and source point 502 is shown in close-up to illustrate a process of projecting the source point from a Cartesian reference frame into a road-centered reference frame.

Referring to the close-up of the region 506, a linear segment 512 connects a first waypoint (i.e., waypoint 310d) and a second waypoint (i.e., waypoint 310e) of the spline. Curve 514 represents the continuous realization of the road's curve (i.e. the relevant segment of the polynomial spline) with which waypoints 310d and 310e coincide.

In a first step, a projection line 518 is drawn perpendicular to linear segment 512 and passing through the source point 502. An intersection between the projection line 518 and the linear segment 512 generates a linear projection 516 of the source point 502 on linear segment 512. In a second step, the linear projection 516 is used to determine a first estimate 520 of a longitudinal component of the source point 502 in the road-based reference frame. The first estimate 520 is also referred to herein as an S-value estimate ($s^{[0]}$). The first estimate 520 is located on curve 514.

In one embodiment, a distance along linear segment 512 between the linear projection 516 and the waypoint 310d is determined and an equivalent distance from the waypoint 310d along curve 514 is determined to find the location of the first estimate 520. An interpolation is then performed using the first estimate 520 to determine a second estimate 522 of the longitudinal component of the source point 502 in the road-based reference frame. The second estimate 522 is also referred to herein as a fine-grained estimate s* and is located on curve 514.

The interpolation involves a Taylor expansion of Frenet-Serret formulas for a particle moving along a curve. By assuming constant-radius for curve 514 at the locality of the first estimate 520, a unit normal vector 526 (i.e., unit vector $\overrightarrow{N^{[0]}}$) is determined at the location of the first estimate 520. The realization of the first estimate 520 on curve 514 is represented continuously by a polynomial. Since the location of the first estimate 520 is performed online, the processor has access only to waypoints. Curve 514 is therefore a reconstruction of the polynomial from the waypoint 310d and waypoint 310e. The realization of the first estimate 520 on curve 514 gives the radius 524 of a tangent circle to curve 514 at the location of the first estimate 520. This tangent circle is represented by its origin O (point 510) and has a radius r. A vector relation shown in Eq. (1) relates the source point 502, origin 510 and first estimate 520:

$$\overrightarrow{Op} = r \cdot \overrightarrow{N^{[0]}} + \overrightarrow{p\alpha(s^{[0]})} \qquad \text{Eq. (1)}$$

where $s^{[0]}$ is a distance travelled along the curve 514 from waypoint 310d and $\alpha(s^{[0]})$ is the coordinates of $s^{[0]}$ in the Cartesian reference frame (i.e., x, y, $\overrightarrow{T}$, $\overrightarrow{N}$ κ, κ') at the location of $s^{[0]}$ along the curve 514th. An angle β between the unit normal vector 526 and the origin-source vector 528 is determined using the law of cosines as shown in Eq. (2):

$$\cos(\beta) = \mathrm{dot}\left(\overrightarrow{N^{[0]}} \cdot \overrightarrow{Op}\right) / \left|\overrightarrow{Op}\right| \qquad \text{Eq. (2)}$$

Once the angle β has been determined from Eq. (2), the second estimate 522 is determined using Eq. (3):

$$s^* = s^{[0]} + \beta \cdot r \qquad \text{Eq. (3)}$$

Once the second estimate 522 (i.e., s*) has been determined, a realization $\alpha(s^{[0]})$ can be determined by traveling along curve 514 to longitude s* by distance subtending angle β. A lateral component of the source point 502 in the road-centered reference frame can be determined using the realization of the second estimate $\alpha(s^*)$, where $$\overrightarrow{\alpha(s^*)p} = \overrightarrow{Op} - \overrightarrow{O\alpha(s^*)} \qquad \text{Eq. (4)}$$

From these components, velocities and accelerations of the source point 502 can be determined in the road-centered reference frame and a trajectory for the autonomous vehicle can be calculated, thus giving the coordinates (s,ṡ,s̈,d,ḋ,d̈) in the road-centered reference frame.

Figure 6:
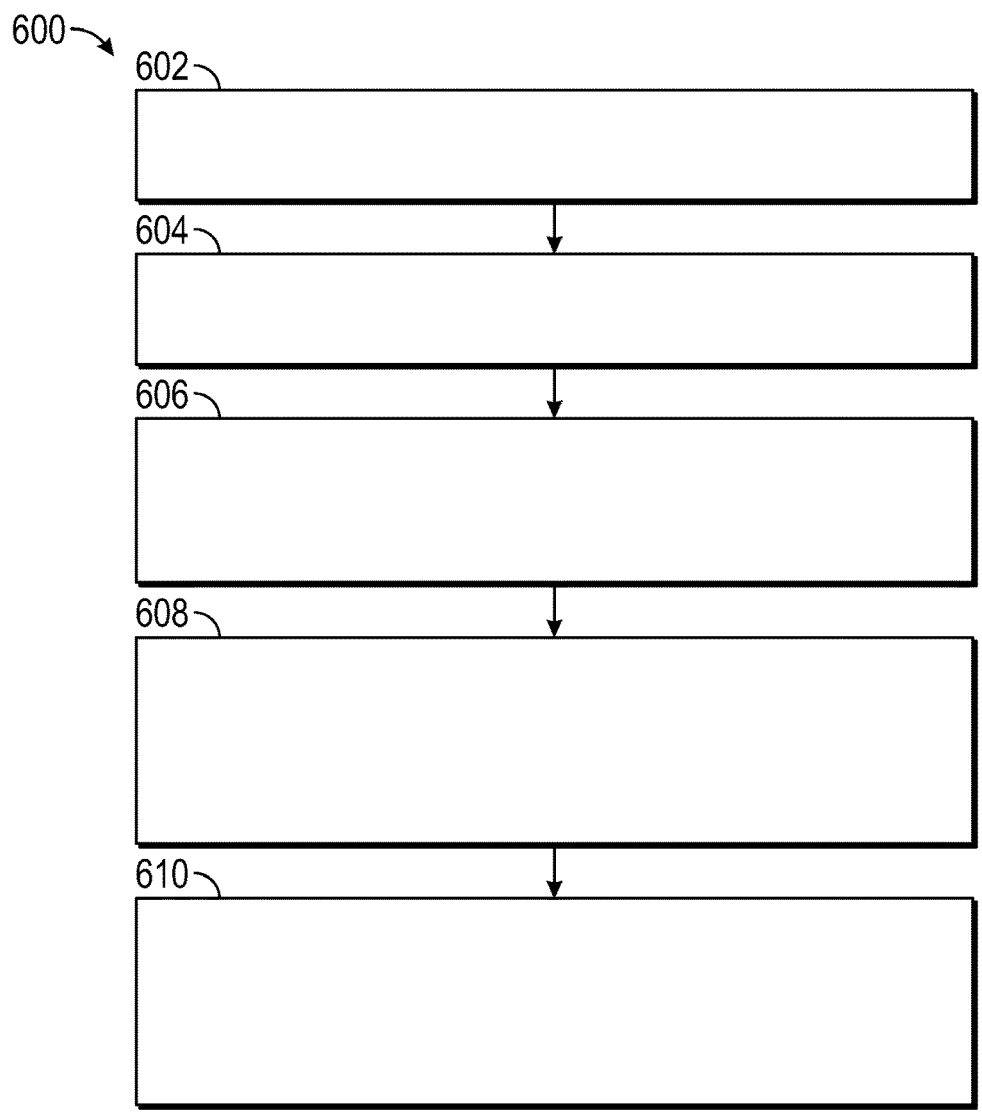
FIG. 6 shows a flowchart illustrating a method for determining a longitudinal component for a source point in a road-centered reference frame.

FIG. 6 shows a flowchart 600 illustrating a method for determining a longitudinal component for a source point in a road-centered reference frame. In box 602, Cartesian coordinates for the source point are obtained in a Cartesian reference frame as well as a plurality of waypoints of the road-based reference frame. In box 604, a set of relevant waypoints to the source point are determined. In various embodiments, the set of relevant waypoints is determined by forming waypoint clusters and a source cluster including the source point and determining which waypoint clusters are closest to the source cluster. In box 606, the source point is projected onto a line connecting a first waypoint and a second waypoint adjacent the first waypoint and from the same waypoint cluster. The projection of the source point onto the line generates a linear projection of the source point.

In box 608, a first estimate of a longitudinal component of the source point in the road-centered reference frame is determined on the polynomial spline segment connecting the first waypoint and second waypoint using the linear projection. In box 610, a second estimate of the longitudinal component of the source point in the road-centered reference frame is determined from an interpolation of the first estimate along a constant radius-arc approximation at the locality of the first estimate. Once the second estimate is determined, a lateral position of the source point is determined based on the second estimate and a trajectory for the autonomous vehicle can be calculated in the road-centered reference frame based on the source point.

Figure 7:
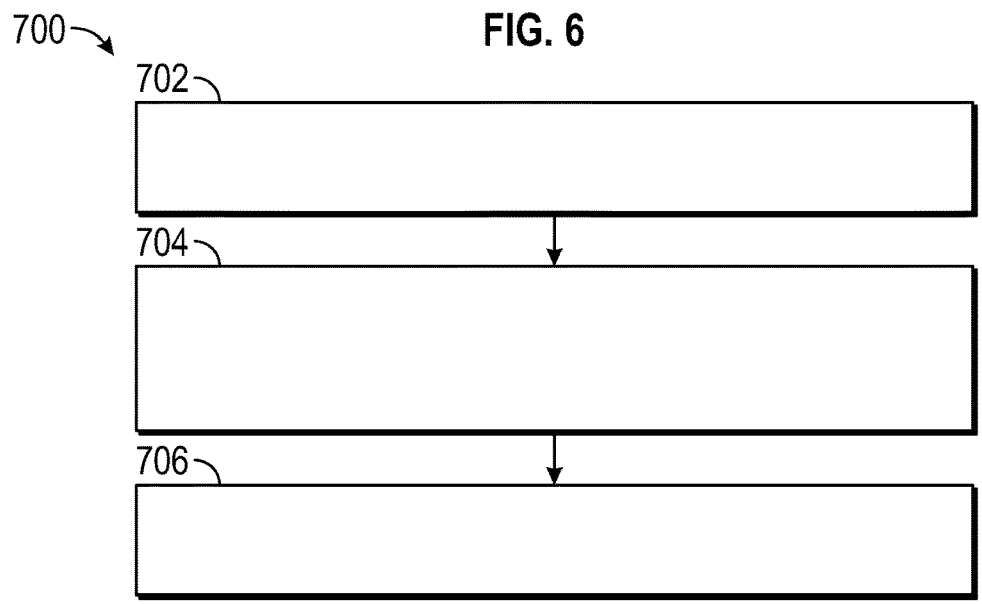
FIG. 7 shows a flowchart for transforming from the road-centered reference frame back to the Cartesian reference frame.

FIG. 7 shows a flowchart 700 for transforming from the road-centered reference frame back to the Cartesian reference frame. In box 702, the road-centered coordinates for a selected point is determined. In box 704, a projection of the selected point that lies on the spline of reference is determined. The projection has the same longitudinal coordinate as the selected point, with the lateral coordinate equal to zero). The cartesian realization of the projection is determined by either sampling the continuous spline representation at the longitude coordinate, or by finding the waypoint closest to the projection and interpolating using a Taylor series approximation and Frenet-Serret formulas. The closest waypoint can be determined by rounding the longitude coordinate of the projection to the closest value according to the polynomial functions uniform sampling frequency discussed herein with respect to FIG. 3. In box 706, the coordinates of the selected point are transformed into the Cartesian reference frame using the statistics (location, yaw, curvature and its first derivative) of the reference spline at the selected point.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method of operating an autonomous vehicle, comprising:
   determining, in a Cartesian reference frame, a polynomial representation of a lane center of a road and a source point representative of an object;
   sampling a first waypoint and a second waypoint along the lane center from the polynomial representation of the lane center;
   determining a linear projection of the source point to a linear segment connecting the first waypoint and the second waypoint;
   determining a distance between the linear projection and the first waypoint along the linear segment;
   determining a first estimate of a longitudinal component of the source point in a road-based reference frame based on the linear projection by placing the first estimate on the polynomial representation of the lane center between the first waypoint and the second waypoint at an equivalent distance from the first way point;
   determining a second estimate of the longitudinal component of the source point in the road-based reference frame from the first estimate, the second estimate located on the polynomial representation;
   determining a coordinate of the source point in the road-based reference frame from the second estimate of the longitudinal component; and
   operating the vehicle with respect to the object using the coordinate of the source point in the road-based reference frame.

2. The method of claim 1, further comprising determining the second estimate of the longitudinal component using a circular arc approximation to the curve.

3. The method of claim 1, further comprising realizing the second estimate in the Cartesian reference frame by interpolating a closest waypoint to the second estimate using a Taylor series approximation and Frenet-Serret formulas.

4. The method of claim 1, further comprising grouping at least the first waypoint and the second waypoint into a plurality of waypoint clusters and selecting a waypoint cluster from the plurality of waypoint clusters based on a distance from the waypoint cluster to the source point.

5. The method of claim 4, further comprising forming a source cluster that includes the source point and selecting the waypoint cluster based on the distance between the source cluster and the waypoint cluster.

6. The method of claim 1, further comprising determining a lateral component of the source point using the second estimate of the longitudinal component.

7. The method of claim 1, wherein the polynomial representation of the lane center of the road is a spline of polynomials.

8. A system for operating an autonomous vehicle, comprising:
   a sensor for sensing a lane center of road and an object; and
   a processor configured to:
      determine, in a Cartesian reference frame, a polynomial representation of the lane center of the road and a source point representative of the object;
      sample a first waypoint and a second waypoint along the lane center from the polynomial representation of the lane center;
      determine a linear projection of the source point to a line connecting the first waypoint and the second waypoint;
      determine a distance between the linear projection and the first waypoint along the linear segment;
      determine a first estimate of a longitudinal component of the source point in a road-based reference frame based on the linear projection by placing the first estimate on the polynomial representation of the lane center between the first waypoint and the second waypoint at an equivalent distance from the first way point;
      determine a second estimate of the longitudinal component of the source point in the road-based reference frame from the first estimate, the second estimate located on the polynomial representation;
      determine a coordinate of the source point in the road-based reference frame from the second estimate of the longitudinal component; and
      operate the vehicle with respect to the object using the coordinate of the source point in the road-based reference frame.

9. The system of claim 8, wherein the processor is further configured to determine the second estimate using a circular arc approximation to the curve.

10. The system of claim 8, wherein the processor is further configured to realize the second estimate in the Cartesian reference frame by interpolating a closest waypoint to the second estimate using a Taylor series approximation and Frenet-Serret formulas.

11. The system of claim 8, wherein the processor is further configured to group at least the first waypoint and the second waypoint into a plurality of waypoint clusters and select a waypoint cluster from the plurality of waypoint clusters based on a distance from the waypoint cluster to the source point.

12. The system of claim 11, wherein the processor is further configured to form a source cluster that includes the source point and select the waypoint cluster based on the distance between the source cluster and the waypoint cluster.

13. The system of claim 8, wherein the processor is further configured to determine a lateral component of the source point using the second estimate of the longitudinal component.

14. The system of claim 8, wherein the polynomial representation of the lane center of the road is a spline of polynomials.

15. An autonomous vehicle, comprising:
a sensor for sensing a lane center of road and an object; and
a processor configured to:
determine, in a Cartesian reference frame, a polynomial representation of the lane center of the road and a source point representative of the object;
sample a first waypoint and a second waypoint along the lane center from the polynomial representation of the lane center;
determine a linear projection of the source point to a line connecting the first waypoint and the second waypoint;
determine a distance between the linear projection and the first waypoint along the linear segment;
determine a first estimate of a longitudinal component of the source point in a road-based reference frame based on the linear projection by placing the first estimate on the polynomial representation of the lane center between the first waypoint and the second waypoint at an equivalent distance from the first waypoint;
determine a second estimate of the longitudinal component of the source point in the road-based reference frame from the first estimate, the second estimate located on the polynomial representation;
determine a coordinate of the source point in the road-based reference frame from the second estimate of the longitudinal component; and
operate the vehicle with respect to the object using the coordinate of the source point in the road-based reference frame.

16. The vehicle of claim 15, wherein the processor is further configured to determine the second estimate using a circular arc approximation to the curve and realize the second estimate in the Cartesian frame by interpolating the closest waypoint to the second estimate using a Taylor series approximation and Frenet-Serret formulas.

17. The vehicle of claim 15, wherein the processor is further configured to group at least the first waypoint and the second waypoint into a plurality of waypoint clusters, from a source cluster that includes the source point, and select a waypoint cluster from the plurality of waypoint clusters based on a distance between the source cluster and the waypoint cluster.

18. The vehicle of claim 15, wherein the processor is further configured to determine a lateral component of the source point using the second estimate of the longitudinal component.

19. The vehicle of claim 15, wherein the polynomial representation of the lane center of the road is a spline of polynomials.

* * * * *